(12) United States Patent
Reger et al.

(10) Patent No.: US 7,127,798 B1
(45) Date of Patent: Oct. 31, 2006

(54) METHOD FOR CONVERTING DISK DRIVE STORAGE ENCLOSURE INTO A STANDALONE NETWORK STORAGE SYSTEM

(75) Inventors: Brad A. Reger, Dublin, CA (US); Steven J. Valin, Nevada City, CA (US)

(73) Assignee: Network Appliance Inc., Sunnyvale, CA (US)

( * ) Notice: Subject to any disclaimer, the term of this patent is extended or adjusted under 35 U.S.C. 154(b) by 210 days.

(21) Appl. No.: 10/407,681

(22) Filed: Apr. 4, 2003

(51) Int. Cl.
*G11B 5/127* (2006.01)
*H04R 31/00* (2006.01)

(52) U.S. Cl. .................. 29/603.03; 29/603.02; 709/203; 709/219; 709/223; 709/217; 710/2; 710/3; 710/5; 710/20; 715/744

(58) Field of Classification Search ............ 29/603.02, 29/603.03; 709/203, 219, 217, 223, 249, 709/250; 710/2, 3, 5, 20; 715/744; 714/5–8, 714/42, 710
See application file for complete search history.

(56) References Cited

U.S. PATENT DOCUMENTS

| | | | |
|---|---|---|---|
| 5,850,562 A * | 12/1998 | Crump et al. .................. 713/1 |
| 6,404,624 B1 * | 6/2002 | Jeong ......................... 361/683 |
| 6,687,797 B1 | 2/2004 | Walton |
| 6,728,897 B1 | 4/2004 | Cramer et al. |
| 6,732,243 B1 | 5/2004 | Busser et al. |
| 6,789,149 B1 * | 9/2004 | Bhadsavle et al. .......... 710/302 |
| 6,868,417 B1 | 3/2005 | Kazar et al. |
| 6,873,627 B1 * | 3/2005 | Miller et al. ................. 370/466 |
| 6,920,579 B1 | 7/2005 | Cramer et al. |
| 6,920,580 B1 | 7/2005 | Cramer et al. |
| 6,948,012 B1 | 9/2005 | Valin et al. |
| 2003/0065841 A1 | 4/2003 | Pecone |
| 2004/0133718 A1 | 7/2004 | Kodama et al. |
| 2004/0199719 A1 | 10/2004 | Valin et al. |

FOREIGN PATENT DOCUMENTS

JP 2000276534 A * 10/2000

OTHER PUBLICATIONS

"An architecture for componentized, network-based media services"; Harville, M.; Covell, M.; Wee, S.; Multimedia and Expo, 2003. ICME '03. Proceedings. vol. 2, Jul. 6-9, 2003; pp.: II - 333-6.*
Steve Kenniston, "Unified Storage Technology", Enterprise Storage Group, Technology Brief, Network Appliance, pp. 1-2, Milford, Massechusetts, Dec. 2002.
"Network Appliance Unified Storage Solutions", TR 3195, Network Appliance, Inc., Sunnyvale, California, pp. 1-5, Oct. 1, 2002.
Microsoft Computer Dictionary, Fifth Edition, from"background" to "Background key", p. 48.

* cited by examiner

*Primary Examiner*—Paul D. Kim
(74) *Attorney, Agent, or Firm*—Blakely Sokoloff Taylor & Zafman LLP

(57) ABSTRACT

An existing disk drive storage enclosure is converted into a standalone network storage system by removing one or more input/output (I/O) modules from the enclosure and installing in place thereof one or more server modules ("heads"), each implemented on a single circuit board. Each head contains the electronics, firmware and software along with built-in I/O connections to allow the disks in the enclosure to be used as a Network-Attached file Server (NAS) or a Storage Area Network (SAN) storage device. An end user can also remove the built-in head and replace it with a standard I/O module to convert the enclosure back into a standard disk drive storage enclosure. Two internal heads can communicate over a passive backplane in the enclosure to provide full cluster failover (CFO) capability.

6 Claims, 9 Drawing Sheets

METHOD FOR CONVERTING DISK DRIVE STORAGE ENCLOSURE INTO A STANDALONE NETWORK STORAGE SYSTEM

CROSS-REFERENCE TO RELATED APPLICATIONS

This application is related to U.S. patent application Ser. No. 10/407,535, filed on Apr. 4, 2003 and entitled, "Standalone Network Storage System Enclosure Including Head and Multiple Disk Drives Connected to a Passive Backplane", and to U.S. patent application Ser. No. 10/407,538, filed on Apr. 4, 2003 and entitled, "Standalone Storage System with Multiple Heads in an Enclosure Providing Cluster Failover Capability".

FIELD OF THE INVENTION

At least one embodiment of the present invention pertains to storage systems, and more particularly, to a method and apparatus for converting a disk drive storage enclosure into a standalone network storage system and vice versa.

BACKGROUND

A file server is a network-connected processing system that stores and manages shared files in a set of storage devices (e.g., disk drives) on behalf of one or more clients. The disks within a file system are typically organized as one or more groups of Redundant Array of Independent/Inexpensive Disks (RAID). One configuration in which file servers can be used is a network attached storage (NAS) configuration. In a NAS configuration, a file server can be implemented in the form of an appliance that attaches to a network, such as a local area network (LAN) or a corporate intranet. An example of such an appliance is any of the Filer products made by Network Appliance, Inc. in Sunnyvale, Calif.

Another specialized type of network is a storage area network (SAN). A SAN is a highly efficient network of interconnected, shared storage devices. Such devices are also made by Network Appliance, Inc. One difference between NAS and SAN is that in a SAN, the storage appliance provides a remote host with block-level access to stored data, whereas in a NAS configuration, the file server normally provides clients with only file-level access to stored data.

Current file server systems used in NAS environments are generally packaged in either of two main forms: 1) an all-in-one custom-designed system that is essentially just a standard computer with built-in disk drives, all in a single chassis (enclosure); or 2) a modular system in which one or more sets of disk drives, each in a separate chassis, are connected to an external file server "head" in another chassis. Examples of all-in-one file server systems are the F8x, C1xxx and C2xxx series Filers made by Network Appliance of Sunnyvale, Calif.

In this context, a "head" means all of the electronics, firmware and/or software (the "intelligence") that is used to control access to storage devices in a storage system; it does not include the disk drives themselves. In a file server, the head normally is where all of the "intelligence" of the file server resides. Note that a "head" in this context is not the same as, and is not to be confused with, the magnetic or optical head used to physically read or write data to a disk.

In a modular file server system, the system can be built up by adding multiple chassis in some form of rack and then cabling the chassis together. The disk drive enclosures are often called "shelves" and, more specifically, "just a bunch of disks" (JBOD) shelves. The term JBOD indicates that the enclosure essentially contains only physical storage devices and no electronic "intelligence". Some disk drive enclosures include one or more RAID controllers, but such enclosures are not normally referred to as "JBOD" due to their greater functional capabilities. A modular file server system is illustrated in FIG. 1 and is sometimes called a "rack and stack" system. In FIG. 1, a file server head 1 is connected by external cables to multiple disk shelves 2 mounted in a rack 3. The file server head 1 enables access to stored data by one or more remote client computers (not shown) that are connected to the head 1 by external cables. Examples of modular heads such as head 1 in FIG. 1 are the FAS800 and FAS900 series filer heads made by Network Appliance.

A problem with the all-in-one type of system is that it is not very scalable. In order to upgrade the server head, the user needs to swap out the old system and bring in a new one, and then he has to physically move drives from the old enclosure to the new enclosure. Alternatively, the user could copy data from the old to the new, however, doing so requires double the disk capacity during the copy operation (one set to hold the old source data and one set to hold the new data) and a non-trivial amount of time to do the copying. Neither of these approaches is simple or easy for a user to do.

A problem with the modular type of system is that it is not cost-effective for smaller, minimally-configured storage systems. There is a fixed overhead of at least two chassis (one head plus one disk shelf) with their power supplies and cooling modules as well as administrative overhead associated with cabling one chassis to the other and attendant failures associated with cables. In order to make each head as modular as possible, the head itself typically includes a motherboard and one or more input/output (I/O) boards. The infrastructure to create this modularity is amortized across the fully configured systems but represents high overhead for minimally configured systems.

What is needed, therefore, is a network storage system which overcomes these disadvantages.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for converting a JBOD disk drive storage enclosure into a standalone network storage system and vice versa are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

As described in greater detail below, a JBOD disk drive shelf can be converted into a standalone network storage system by removing one or more input/output (I/O) modules from its enclosure and installing in place of the I/O modules one or more heads, each implemented on a single circuit board. Each such head contains the electronics, firmware and software along with built-in I/O connections to allow the disks in the enclosure to be used as a NAS file server and/or a SAN storage device. Two internal heads can communicate over a passive backplane in the enclosure to provide full cluster failover (CFO) capability. An end user can also remove the built-in head and replace it with a standard I/O module to convert the enclosure back into a standard JBOD disk drive storage enclosure. This standard enclosure could then be grown in capacity and/or performance by combining it with additional modular storage shelves and a separate, more-capable modular file server head. This approach provides scalability and upgradability with minimum effort required by the user.

Figure 2:
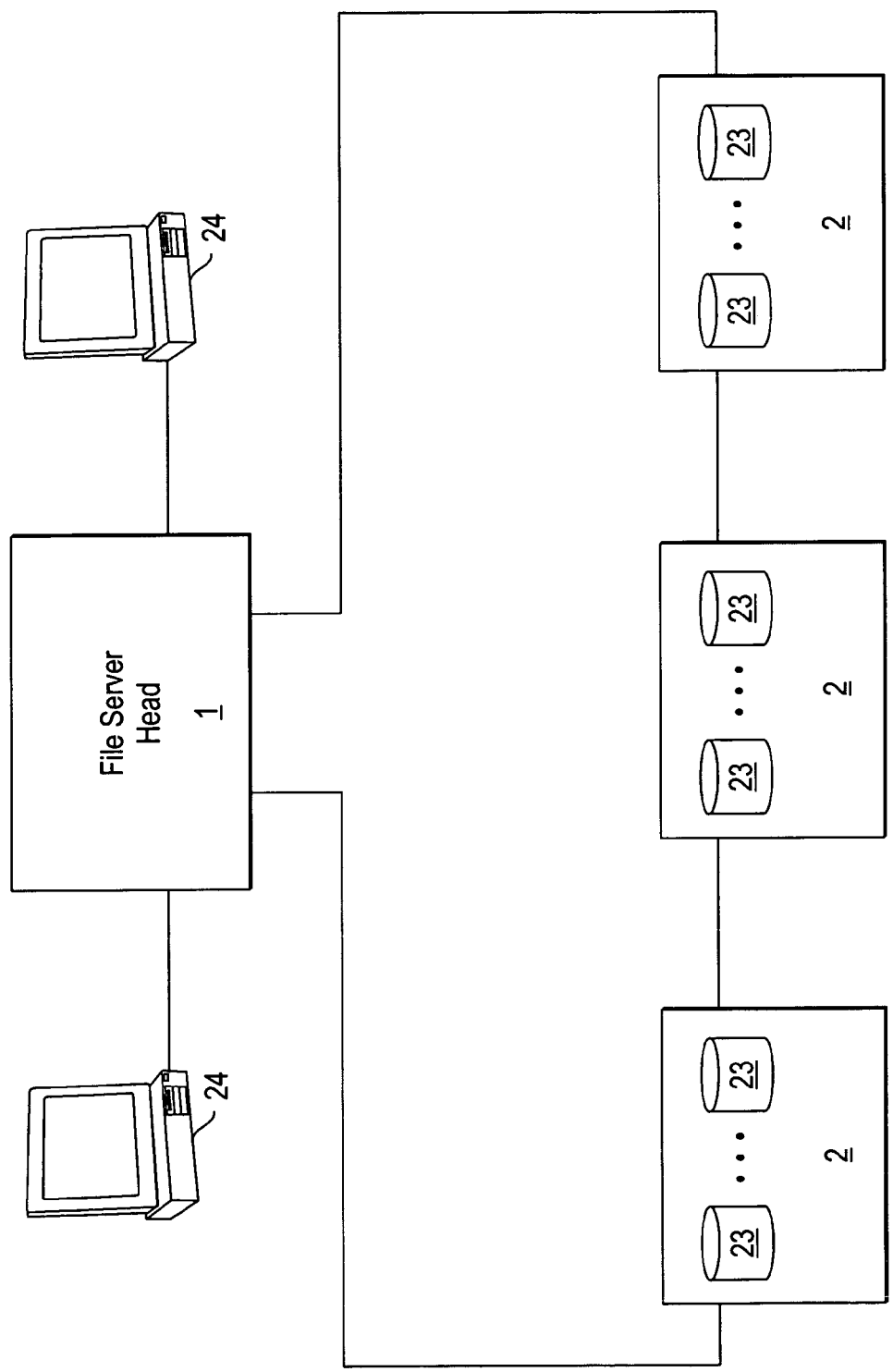
FIG. 2 is a block diagram of a modular file server system.

FIG. 2 is a functional block diagram of a modular type file server system such as mentioned above. A modular file server head 1 is contained within its own enclosure and is connected to a number of the external disk drive shelves 2 in a loop configuration. Each shelf 2 contains multiple disk drives 23 operated under control of the head 1 according to RAID protocols. The file server head 1 provides a number of clients 24 with access to shared files stored in the disk drives 23. Note that FIG. 2 shows a simple network configuration characterized by a single loop with three shelves 2 in it; however, other network configurations are possible. For example, there can be a greater or smaller number of shelves 2 in the loop; there can be more than one loop attached to the head 1; or, there can even be one loop for every shelf 2.

Figure 1:
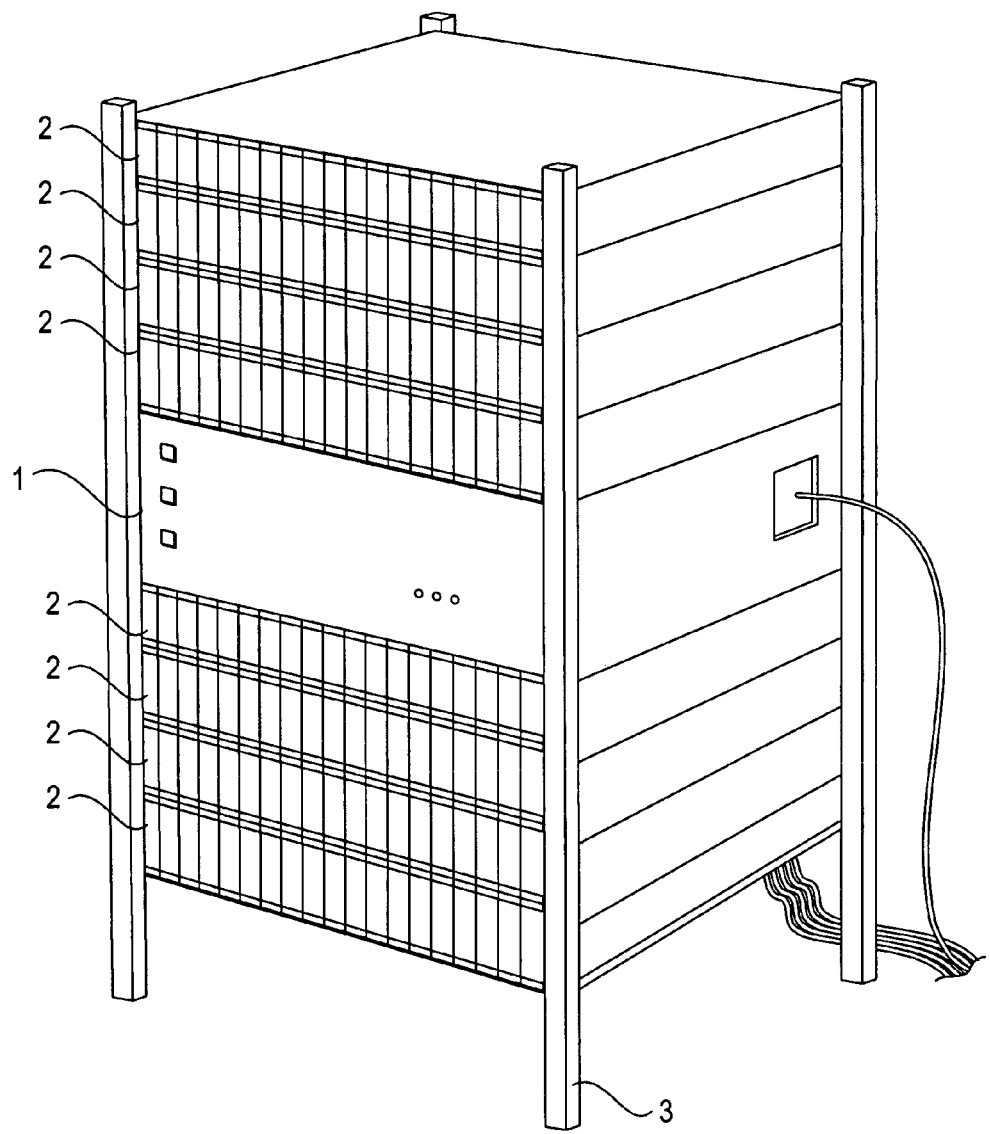
FIG. 1 illustrates a portion of a "rack and stack" (modular) file server system.
Figure 3:
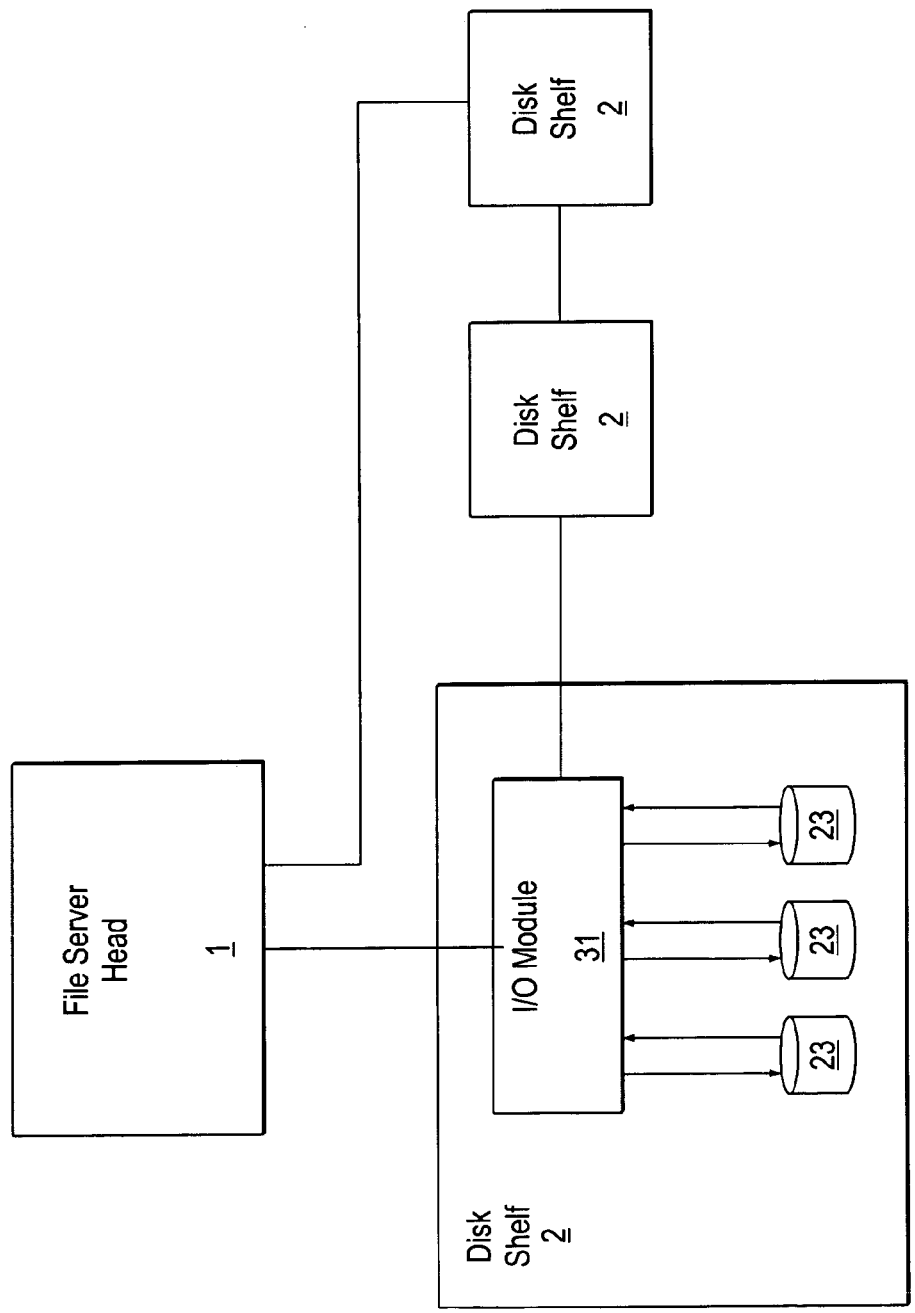
FIG. 3 illustrates in greater detail a disk drive shelf of the file server system of FIG. 2.

FIG. 3 illustrates in greater detail a disk drive shelf 2 of the type shown in FIGS. 1 and 2 (the clients 24 are not shown). Each of the shelves 2 can be assumed to have the same construction. Each shelf 2 includes multiple disk drives 23. Each shelf also includes at least one I/O module 31, which is connected between the shelf 2 and the next shelf 2 in the loop and in some cases (depending on where the shelf 2 is placed in the loop) to the head 1. The I/O module 31 is a communications interface between the head 1 and the disk drives 23 in the shelf 2. The functionality of the I/O module 31 is described further below. The disk drives 23 in the shelf 2 can be connected to the I/O module 31 by a standard Fibre Channel connection.

The use of RAID protocols between the head 1 and the shelves 2 enhances the reliability/integrity of data storage through the redundant writing of data "stripes" across physical disks 23 in a RAID group and the appropriate writing of parity information with respect to the striped data. In addition to acting as a communications interface between the head 1 and the disk drives 23, the I/O module 31 also serves to enhance reliability by providing loop resiliency. Specifically, if a particular disk drive 23 within a shelf 2 is removed, the I/O module 31 in that shelf 2 simply bypasses the missing disk drive and connects to the next disk drive within the shelf 2. This functionality maintains connectivity of the loop in the presence of disk drive removals and is provided by multiple Loop Resiliency Circuits (LRCs) (not shown) included within the I/O module 31. In at least one embodiment, the LRCs are implemented in the form of port bypass circuits (PBCs) within the I/O module 31 (typically, a separate PBC for each disk drive 23 in the shelf 2). Note that a PBC is only one (simple) implementation of an LRC. Other ways to implement an LRC include a hub or a switch, although these approaches tend to be more complicated. The implementation details of I/O modules and PBCs such as described here are well known in the relevant art and are not needed to understand the present invention.

Figure 4:
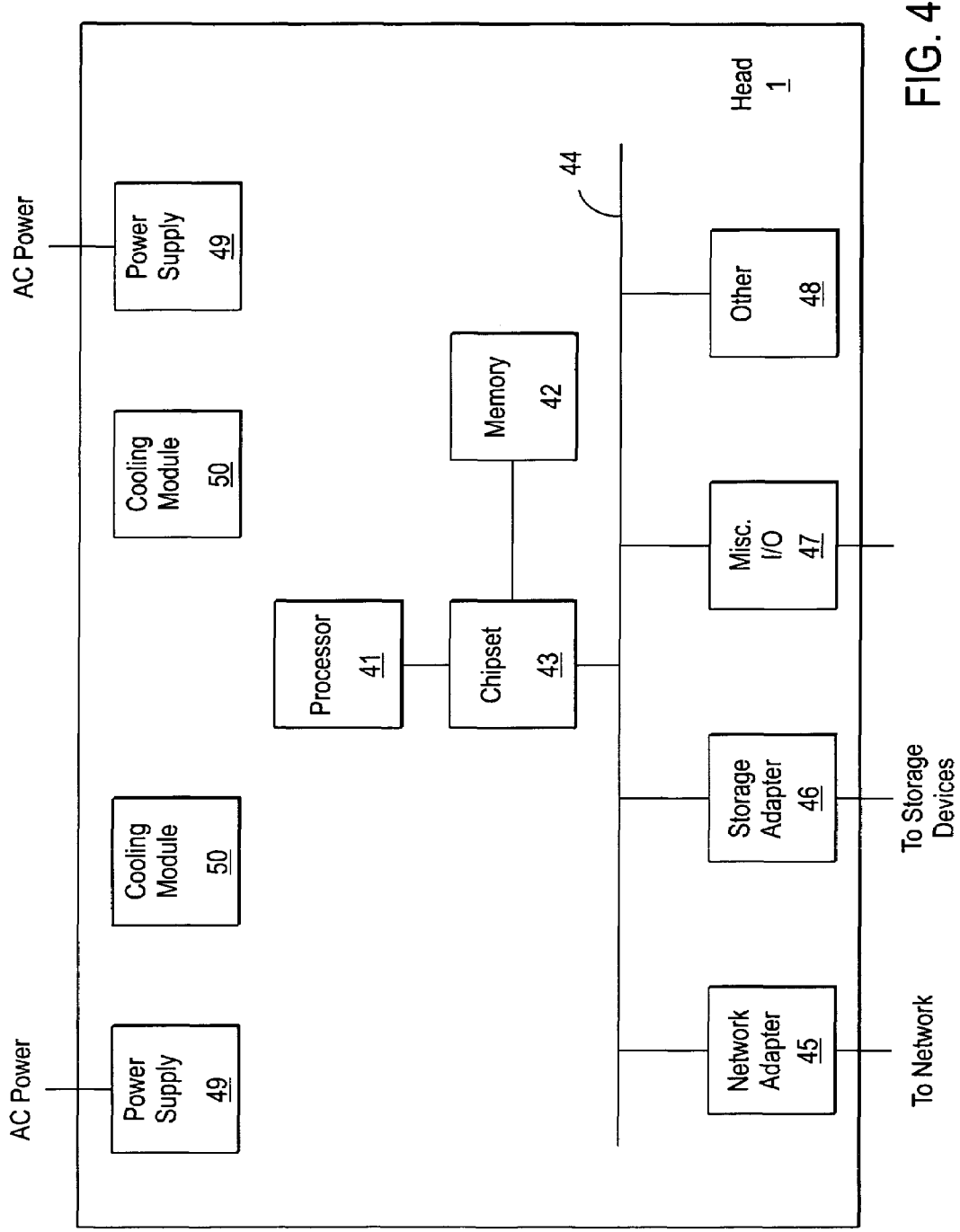
FIG. 4 is an architectural block diagram of a file server head.

As mentioned above, access to data in a file server system is controlled by a file server head, such as head 1 in the above-described figures. Also as described above, in a modular file server system the head 1 is contained within its own chassis and is connected to one or more external JBOD disk shelves 2 in their own respective chassis. FIG. 4 is an architectural block diagram of such a file server head 1, according to certain embodiments. As shown, the head 1 includes a processor 41, memory 42, and a chipset 43 connecting the processor 41 to the memory 42. The chipset 43 also connects a peripheral bus 44 to the processor 41 and memory 42. Also connected to the peripheral bus 44 are one or more network adapters 45, one or more storage adapters 46, one or more miscellaneous I/O components 47, and in some embodiments, one or more other peripheral components 48. The head 1 also includes one or more power supplies 49 and one or more cooling modules 50 (preferably at least two of each for redundancy).

The processor 41 is the central processing unit (CPU) of the head 1 and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The memory 42 may be or include any combination of random access memory (RAM), read-only memory (ROM) (which may be programmable) and/or Flash memory or the like. The chipset 43 may include, for example, one or more bus controllers, bridges and/or adapters. The peripheral bus 44 may be, for example, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). Each network adapter 45 provides the head 1 with the ability to communicate with remote devices, such as clients 24 in FIG. 2, and may be, for example, an Ethernet adapter. Each storage adapter 46 allows the head 1 to access the external disk drives 23 in the various shelves 2 and may be, for example, a Fibre Channel adapter.

Figure 5:
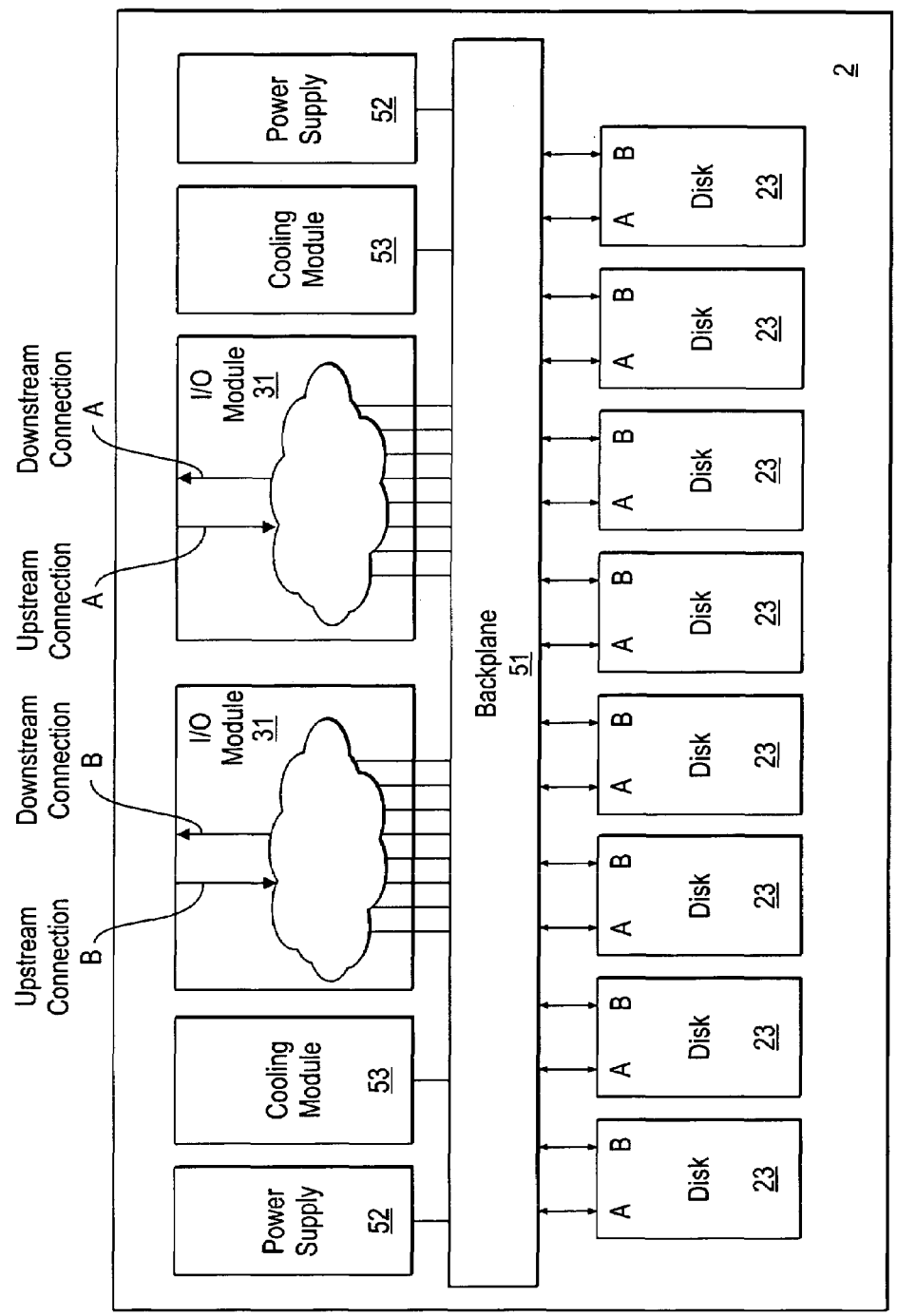
FIG. 5 is a hardware layout block diagram of a JBOD disk drive shelf.

FIG. 5 is a hardware layout block diagram of a JBOD disk drive shelf 2 of the type which may be connected to a separate (external) head 1 in a modular file server system. All of the illustrated components are contained within a single chassis. As shown, all of the major components of the shelf 2 are connected to, and communicate via, a passive backplane 51. The backplane 51 is "passive" in that it has no active electronic circuitry mounted on or in it; it is just a passive communications medium. The backplane 51 can be essentially comprised of just one or more substantially planar substrate layers (which may be conductive or which may be dielectric with conductive traces disposed on/in it), with various pin-and-socket type connectors mounted on it to allow connection to other components in the shelf 2.

Connected to the backplane 51 in the shelf 2 of FIG. 5 are several individual disk drives 23, redundant power supplies 52 and associated cooling modules 53 (which may be substantially similar to power supplies 49 and cooling modules 50, respectively, in FIG. 4), and two I/O modules 31 of the type described above. As described above, the I/O modules 31 provide a communications interface between an external head 1 and the disk drives 23, including providing loop resiliency for purposes of accessing the disk drives 23.

In accordance with at least one embodiment of the invention, a JBOD disk drive shelf 2 such as shown in FIG. 5 can be converted into a standalone network storage system by removing the I/O modules 31 from the chassis and installing in place of them one or more server heads, each implemented on a separate, single circuit board (hereinafter "single-board heads"). Each single-board head contains the electronics, firmware and software along with built-in I/O connections to allow the enclosure to be used as a NAS file server and/or a SAN storage system. The circuit board of each single-board head has various conventional electronic components (processor, memory, communication interfaces, etc.) mounted and interconnected on it, as described in detail below. In other embodiments, the head can be distributed between two or more circuit boards, although a single-board head is believed to be advantageous from the perspective of conserving space inside the chassis.

Figure 6:
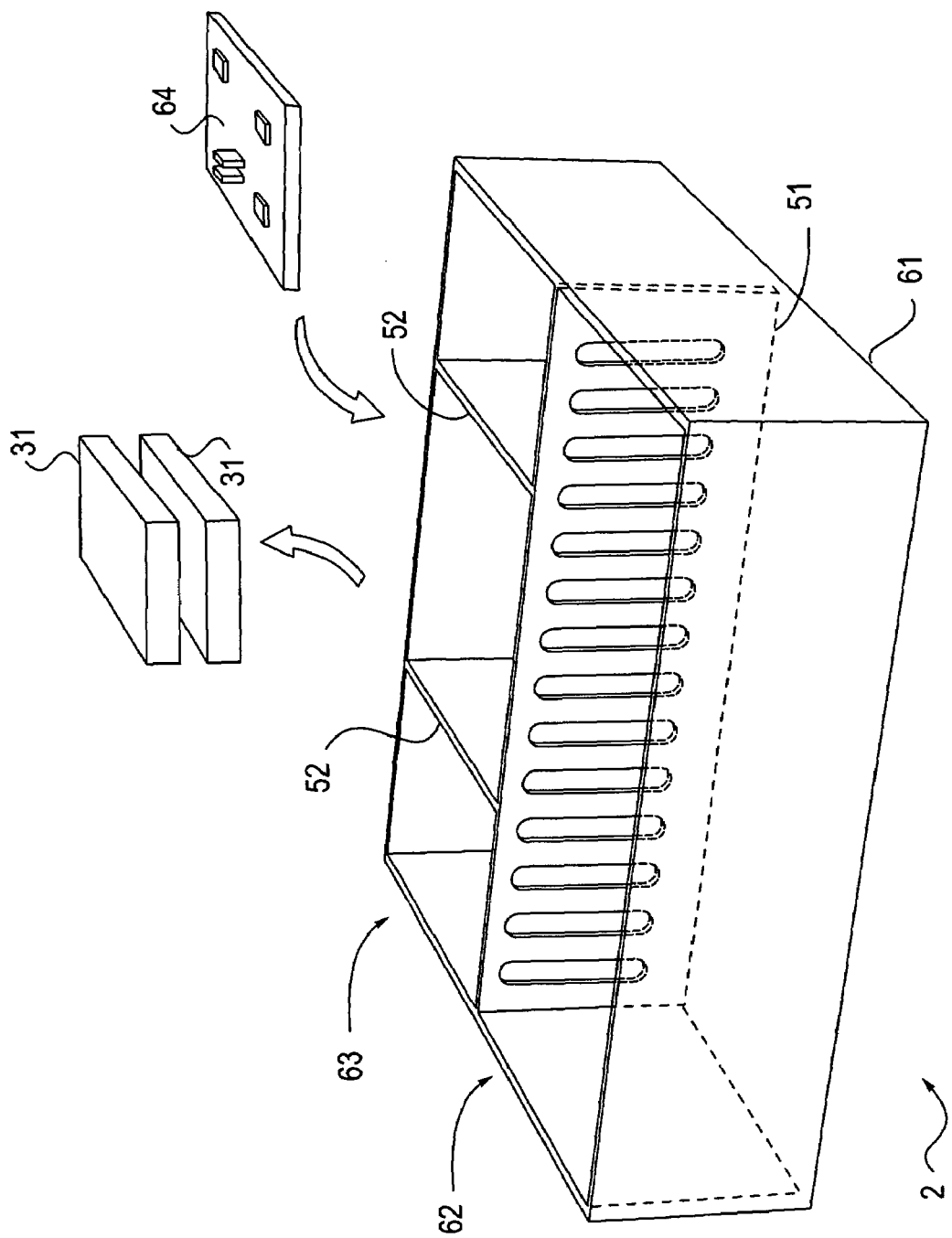
FIG. 6 is a perspective diagram showing the internal structure of a JBOD disk drive shelf being converted into a standalone storage server.

FIG. 6 shows the interior of the JBOD shelf 2 of FIG. 5, as it is being converted into a standalone storage system (e.g., a NAS file server and/or a SAN storage system), in accordance with at least one embodiment of the invention. The chassis 61 of the shelf 2 is shown transparent to facilitate illustration. In the illustrated embodiment, the passive backplane 51 is mounted within the chassis 61 so as to divide the chassis 61 roughly in half, so as to define a front portion 62 of the chassis 61 from a rear portion 63 of the chassis. To facilitate illustration, the disk drives 23 are not shown in FIG. 6, although in the illustrated embodiment they would normally be stacked side-by-side in the front portion 62 of the chassis 61 and connected to the backplane 51. Installed against each outer edge of the rear portion 63 of the chassis 61 are the two power supplies 52 and their cooling modules (not shown). The two I/O modules 31 are normally stacked on top of each other between the two power supplies 52 in the center of the rear portion 63 of the chassis 61 and are normally connected to the backplane 51. Examples of JBOD storage shelves that have a construction similar to that shown in FIGS. 5 and 6 are the RS-1600-FC, SS-1201-FC and SS-1202-FC storage enclosures made by Xyratex, Ltd. of Havant, United Kingdom.

To convert the JBOD shelf 2 into a standalone storage system, the I/O modules 31 are disconnected from the backplane 51, removed from the enclosure, and replaced with one or more single-board heads 64, as shown. The single-board head or heads 64 are connected to the passive backplane 51. The area or "footprint" of each single-board head 64 is no larger than the combined footprint of the stacked I/O modules 31. If two or more single-board heads 64 are installed, they are stacked on top of each other within the chassis 61.

Figure 7:
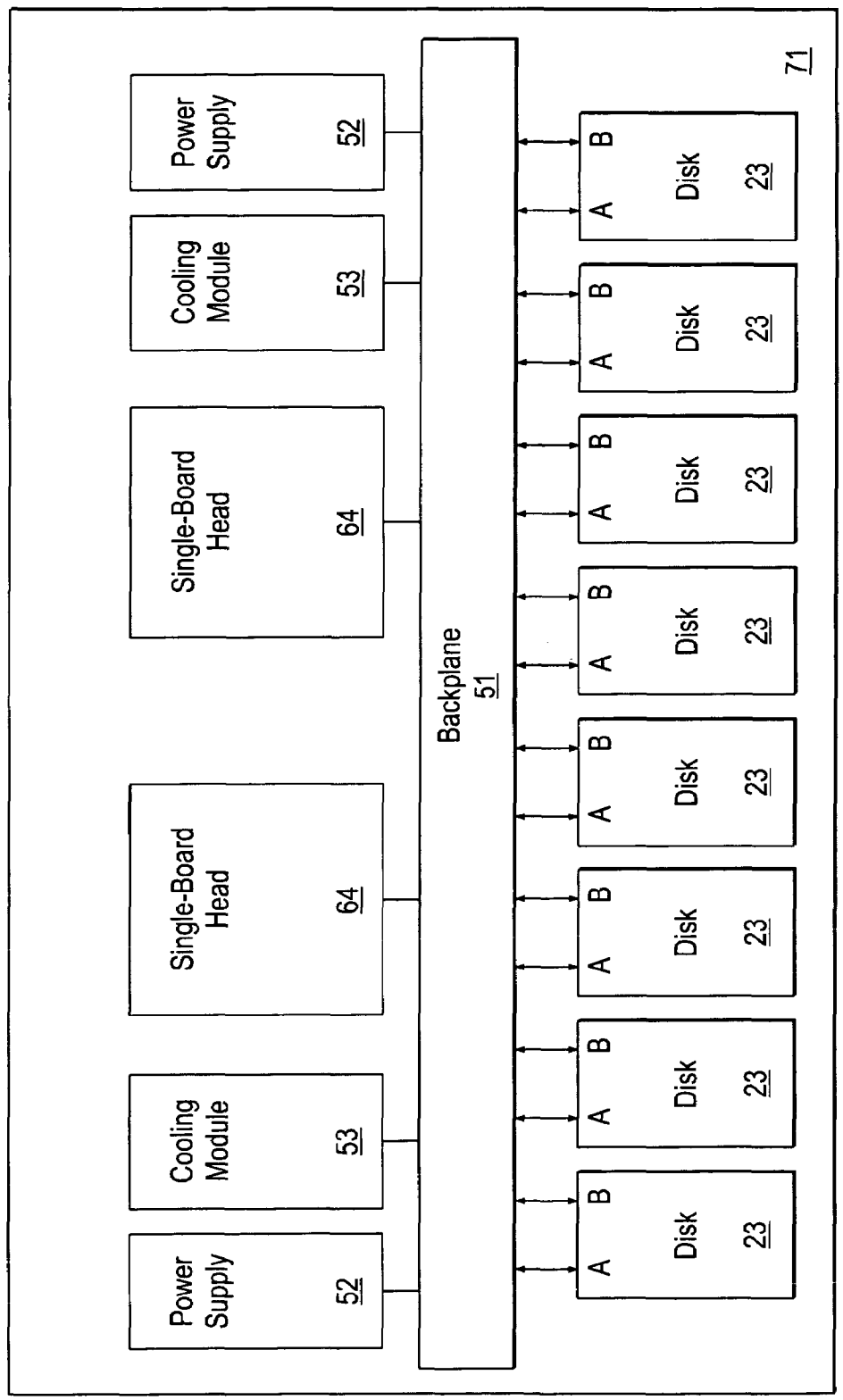
FIG. 7 is a hardware layout block diagram of a standalone file server constructed from a JBOD disk drive shelf.

FIG. 7 is a hardware layout block diagram of a standalone storage system 71 after its conversion from a JBOD shelf 2 as described above. The block diagram is substantially the same as that of FIG. 5, except that each of the I/O modules 31 has been replaced by a single-board head 64 connected to the passive backplane 51. Connecting the heads 64 to the backplane 51 is advantageous, because, among other reasons, it eliminates the need for cables or wires to connect the heads 64. Note that although two heads 64 are shown in FIG. 7, the device 71 can operate as a standalone system with only one head 64.

This standalone system 71 can be easily grown in capacity and/or performance by combining it with additional modular storage shelves and (optionally) with a separate, more capable file server head. This approach provides scalability and upgradability with minimum effort required by the user. In addition, this approach allows the user to add more performance or capacity to his system without physically moving disk drives from the original enclosure or having to copy the data from the original machine to the newer, more capable machine.

Figure 8:
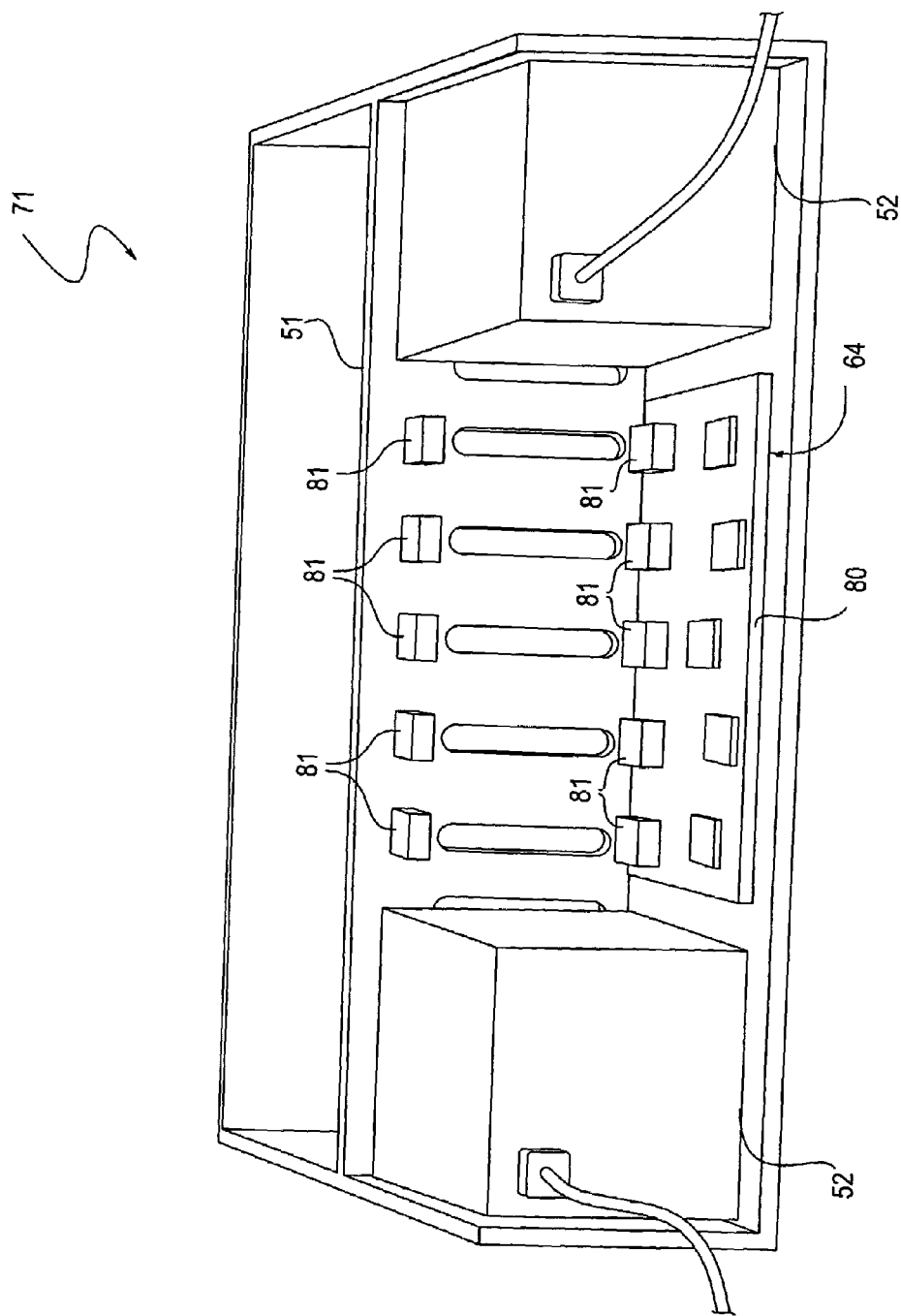
FIG. 8 illustrates a standalone file server, with a file server head implemented on a single circuit board connected to a passive backplane.

FIG. 8 shows a rear perspective view of the standalone storage system 71 according to at least one embodiment of the invention, with one single-board head 64 installed. Not shown in FIG. 8 are the disk drives 23, which are normally installed against the far side of the backplane 51. The single-board head 64 includes various electronic components mounted on a circuit board 80 that is connected to the backplane 51 between the two power supplies 52. The single-board head 64 is connected to the backplane 51 by a number of conventional pin-and-socket type connector pairs 81 mounted on the circuit board and the backplane 51, which may be, for example, connectors with part nos. HM1L52ZDP411H6P and 84688-101 from FCI Electronics/Burndy or similar connectors from Tyco Electronics/AMP.

This manner of installation also allows the single-board head or heads 64 to be easily disconnected and removed, and I/O modules 31 installed (or reinstalled) in place thereof, to convert the system into (or back into) a JBOD shelf. In that case, the JBOD shelf can then be attached with stored data intact to a larger, more capable head (possibly with additional shelves). As noted, this allows the user to add more performance or capacity to his system without physically moving drives from the original shelf or having to copy the data from the original machine to the newer, more capable machine.

Figure 9:
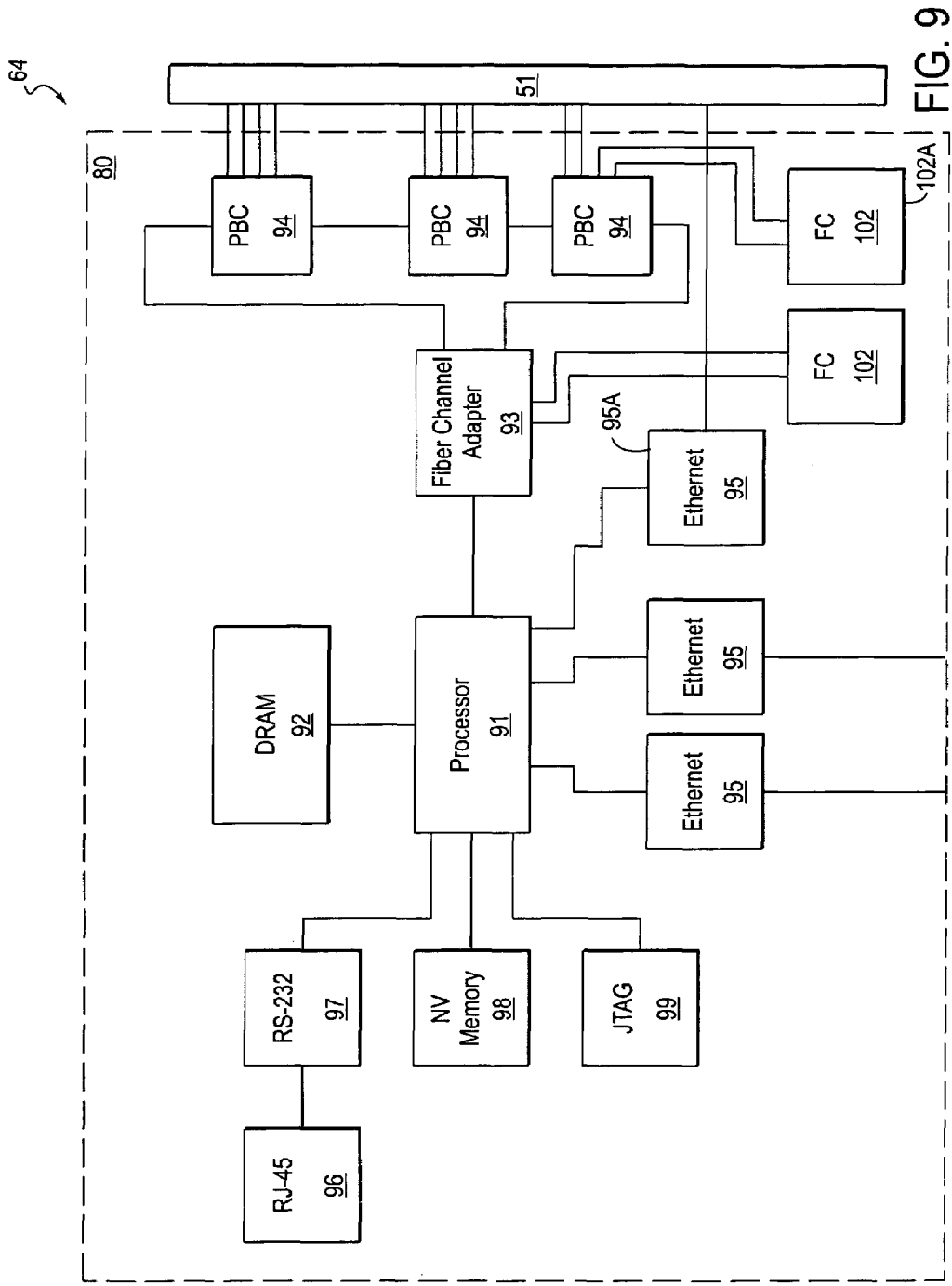
FIG. 9 is a block diagram of a single-board head.

FIG. 9 is a block diagram of a single-board head 64, according to certain embodiments of the invention. The single-board head 64 includes (mounted on a single circuit board 80) a processor 91, dynamic read-only memory (DRAM) 92 in the form of one or more dual inline memory modules (DIMMs), an integrated circuit (IC) Fibre Channel adapter 93, and a number of Fibre Channel based (IC) PBCs 94. The processor 91 controls the operation of the head 64 and, in certain embodiments, is a BCM1250 multi-processor made by Broadcom Corp. of Irvine, Calif. The DRAM 92 serves as the main memory of the head 64, used by the processor 91.

The PBCs 94 are connected to the processor 91 through the Fibre Channel adapter 93 and are connected to the passive backplane 51 through standard pin-and-socket type connectors 81 (see FIG. 8) mounted on the circuit board 81 and on the backplane 51, such as described above. The PBCs 94 are connected to the Fibre Channel adapter 93 in a loop configuration, as shown in FIG. 9. In operation, each PBC 94 can communicate (through the backplane 51) separately with two or more disk drives installed within the same chassis. Normally, each PBC 94 is responsible for a different subset of the disk drives within the chassis. Each PBC 94 provides loop resiliency with respect to the disk drives for which it is responsible, to protect against a disk drive failure in essentially the same manner as done by the I/O modules 31 described above. In other words, in the event a disk drive fails, the associated PBC 94 will simply bypass the failed disk drive. Examples of PBCs with such functionality are the HDMP-0480 and HDMP-0452 from Agilent Technologies in Palo Alto, Calif., and the VSC7127 from Vitesse Semiconductor Corporation in Camarillo, Calif.

The single-board head 64 also includes (mounted on the circuit board 80) a number of IC Ethernet adapters 95. In the illustrated embodiment, two of the Ethernet adapters 95 have external connectors to allow them to be connected to devices outside the chassis for network communication (e.g., to clients); the third Ethernet adapter 95A is routed only to one of the connectors 81 (shown in FIG. 8) that connects to the backplane 51. The third Ethernet adapter 95A (which is connectable to the backplane 51) can be used to communicate with another single-board head 64 installed within the same chassis, as described further below.

The single-board head 64 further includes (mounted on the circuit board 80) a standard RJ-45 connector 96 which is coupled to the processor 91 through a standard RS-232 transceiver 97. This connector-transceiver pair 96 and 97 allows an external terminal operated by a network administrator to be connected to the head 64, for purposes of remotely monitoring or configuring the head 64 or other administrative purposes.

The single-board head 64 also includes (mounted on the circuit board 80) at least one non-volatile memory 98 (e.g., Flash memory), which stores information such as boot firmware, a boot image, test software and the like. The single-board head 64 also includes (mounted on the circuit board 80) a connector 99 to allow testing of the single-board head 64 in accordance with JTAG (IEEE 1149.1) protocols.

The single-board head 64 shown in FIG. 9 also includes (mounted on the circuit board 80) two Fibre Channel connectors 102 to allow connection of the head 64 to external components. One of the Fibre Channel connectors 102 is coupled directly to the Fibre Channel adapter 93, while the other Fibre Channel connector 102A is coupled to the Fibre Channel adapter 93 through one of the PBCs 94. Fibre Channel connector 102A can be used to connect the head 64 to an external disk shelf. Although the single-board head 64 allows the enclosure to be used as a standalone file server without any external disk drives, it may nonetheless be desirable in some cases to connect one or more external shelves to the enclosure to provide additional storage capacity.

In certain embodiments, the processor 91 in the single-board head 64 is programmed (by instructions and data stored in memory 92 and/or in memory 98) so that the enclosure is operable as both a NAS file server (using file-level accesses to stored data) and a SAN storage system (using block-level accesses to stored data) at the same time, i.e., to operate as a "unified" storage device, sometimes referred to as fabric attached storage (FAS) device. In other embodiments, the single-board head 64 is programmed so that the enclosure is operable as either a NAS file server or a SAN storage, but not at the same time, where the mode of operation can be determined after deployment according to a selection by a user (e.g., a network administrator). In other embodiments of the invention, the single-board head 64 is programmed so that the enclosure can operate only as a NAS file server or, in still other embodiments, only as a SAN storage system.

If the single-board head is configured to operate as a NAS fileserver, the single-board head 64 can be configured with the ability to use multiple file based protocols. For example, in certain embodiments the single-board head 64 is able to use each of network file system (NFS), common Internet file system (CIFS) and hypertext transport protocol (HTTP), as necessary, to communicate with external devices, such as disk drives and clients.

As noted above, two or more single-board heads 64 can be included in the standalone system. The inclusion of two or more heads 64 enables the standalone system to be provided with cluster failover (CFO) capability (i.e., redundancy), while avoiding much of the cost and space consumption associated with providing CFO in prior art systems. CFO refers to a capability in which two or more interconnected heads are both active at the same time, such that if one head fails or is taken out of service, that condition is immediately detected by the other head, which automatically assumes the functionality of the inoperative head as well as continuing to service its own client requests. A file server "cluster" is defined to include at least two file server heads connected to at least two separate volumes of disks. In known prior art modular file server systems, a "cluster" includes at least two disk shelves and at least two heads in separate enclosures; thus, at least four separate chassis are needed to provide CFO capability in such prior art.

In contrast, the processor 91 in each single-board head 64 can be programmed to provide CFO functions such as described above, such that two or more single-board heads 64 within a single chassis can communicate with each other to provide CFO capability. In certain embodiments, the two or more single-board heads 64 communicate with each other only via the passive backplane 51, using Gigabit Ethernet protocol. Among other advantages, this type of interconnection eliminates the need for cables to connect the heads 64 to each other and to other components within the chassis. Note that in other embodiments, protocols other than Ethernet may be used for communication between the heads 64.

Thus, a method and apparatus for converting a JBOD disk drive storage enclosure into a standalone network storage system and vice versa have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
uninstalling an input/output (I/O) module from within a storage device that includes a chassis, a plurality of disk drives within the chassis, and, prior to said uninstalling, the input/output (I/O) module, the I/O module configured to operate as an interface between the plurality of disk drives and a storage server head external to the chassis, the storage device configured to operate only under control of the external storage server head;
installing an internal storage server head in the chassis in a space previously occupied by the I/O module, the internal storage server head configured to control access to the plurality of disk drives by an external client, so that the internal storage server head and the plurality of disk drives are collectively operable as a standalone storage system.

2. A method as recited in claim 1, wherein the internal storage server head is implemented on a single circuit board.

3. A method as recited in claim 1, wherein the storage device further comprises a passive backplane within the chassis to couple the I/O module to the plurality of disk drives while the I/O module is installed, and wherein said installing the internal storage server head comprises coupling the internal storage server head to the passive backplane.

4. A method as recited in claim 1, wherein the I/O module includes a loop resiliency circuit.

5. A method of converting a JBOD disk drive shelf into a standalone storage system, the method comprising:

accessing an internal space of a storage device including a plurality of disk drives, the storage device comprising a chassis and, installed within the chassis, the plurality of disk drives, a passive backplane, and an input/output (I/O) module, the I/O module coupled to the plurality of disk drives through the passive backplane as an interface between a storage server head external to the chassis and the plurality of disk drives, the storage device configured to operate only as a JBOD disk drive shelf under control of the external storage server head;

disconnecting the I/O module from the passive backplane;

removing the I/O module from the storage device; and installing an internal storage server head implemented on a single circuit board in the chassis in a space previously occupied by the I/O module, so that the internal storage server head is coupled to the passive backplane, the internal storage server head being configured to control access to the plurality of disk drives by an external client so that the internal storage server head and the plurality of disk drives are collectively operable as a standalone storage system.

6. A method as recited in claim 5, wherein the I/O module includes a loop resiliency circuit.

* * * * *